Patented Apr. 6, 1943

2,315,857

UNITED STATES PATENT OFFICE 2,315,857

MANUFACTURE OF RUBBER

Louis H. Howland, Cheshire, Conn., assignor to United States Rubber Company, New York, N. Y., a corporation of New Jersey No Drawing. Application April 24, 1940, Serial No. 331,384

8 Claims. (Cl. 260—763)

This invention relates to improvements in the technique of processing high carbon black-rubber mixes prior to vulcanization thereof.

The technique of processing high carbon black-rubber mixes prior to vulcanization thereof, whereby to obtain vulcanizates with improvements in physical and chemical properties, is described in Gerke et al. U. S. P. 2,118,601. The improved vulcanizates prepared by this technique differ from the usual vulcanizates produced by older techniques in that they have relatively (1) lower modulus at low elongation, (2) high resistance to abrasion, (3) higher modulus above 300% elongation, (4) low torsional hysteresis, (5) high electrical resistivity, and are (6) relatively softer.

These aforesaid vulcanizates are obtained by incorporating in the rubber a relatively large amount of carbon black, for example, at least 25 parts, and preferably at least 40 parts in the case of the tire treads, by weight of carbon black per 100 parts by weight of rubber, and then subjecting a substantially homogeneous mixture of the ingredients to a heat treatment at a temperature substantially above 250° F., the preferred temperatures being in the range from about 300° F. to 370° F., and masticating the mix during and/or after such heat treatment, or alternately therewith. The duration of the special heat treatment may vary with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration will be found suitable for most purposes, and particularly within the preferred temperature range.

An object of the present invention is to get the desired effects of heat treatment in a shorter period of time, and to provide an agent or promoter to speed up the process of attainment of the desired properties during the technique of processing described in U. S. 2,118,601. I have discovered that the heating operation can be materially shortened by adding to the mixture of rubber and carbon black, prior to the heat treatment a class of chemicals capable of facilitating the said process, viz., organic di(primary) amines. Examples of such chemicals are p,p'-diaminodiphenyl methane, benzidine (p,p'-diaminodiphenyl), polyethylene polyamine (product of reaction ammonia with ethylene dichloride; boiling range 200–375° C.), ethylene diamine, diethylene triamine, triethylene tetramine, tolidine, p-phenylene diamine, naphthalene diamine-1,4; o-methyl p-phenylene diamine; p,p'-diamino benzhydrol; p, p'-diamino diphenyl ketone; p,p'-diamino triphenyl methane; p,p'p'' triamino triphenylmethane; p,p'-diamino diphenyl ethane; p,p'-diamino diphenyl piperazine; p,p'-diamino diphenyl ethylene diamine, p,p'-diamino diphenyl ether, etc. Also included in the scope of the invention are the simple substitution products of the above as alkyl, aryl, alkoxy, halogen, and nitro substituted bodies. Of the aromatic substances, those having a para di-amine structure are preferred. The promoter increases the rate of increase of electrical resistivity in the process of U. S. P. 2,118,601.

The invention is further specifically illustrated with respect to the processing of tire tread compositions, it being understood that such compositions before they are vulcanized are to be subjected to the usual steps of shaping, manipulation and mounting attendant upon the manufacture of a vehicle tire, whether of the solid or pneumatic variety, and in which the final article embodies at least as its tread portion, the vulcanized composition of the invention.

In the following examples illustrating the invention, the "parts" are by weight and refer to parts per 100 parts of rubber.

*Example 1*

A master batch consisting of 100 parts of smoked sheet rubber, 55 parts of carbon black and 2 parts of pine tar was mixed on a mill with the mill roll temperature at about 150° F. for about 20 minutes until the carbon black was thoroughly incorporated. Higher mill temperatures may be used even up to 260° F. which is sometimes reached at the end of a ten minute Banbury cycle in factory master batching. This master batch was divided into two portions and, to one portion A, 0.2 part of p,p'-diaminodiphenyl methane was added on a cool mill and the milling continued until the chemical was thoroughly and substantially homogeneously incorporated. Also the other portion B which is the control containing no added chemical was milled for the same length of time.

Both mixes A and B were then milled 10 minutes at 300° F. After cooling at least five minutes these were recovered; i. e. reduced to a viscosity suitable for milling in of further compounding ingredients, on a cool mill and the following ingredients were added by conventional mixing: 2.5 parts of zinc salt of cocoanut oil acids, 2.0 parts of Kadox brand zinc oxide, 0.9 part of methylene aniline-butaldehyde accelerator, 2.0 parts of acetone-diphenlamine reaction product (antioxidant) and 4 parts of sulfur. The stocks were vulcanized 60 and 90 minutes at 45 pounds steam pressure and the vulcanized stocks showed the following properties:

|  | Cure | A | B |
|---|---|---|---|
| Tensiles and per cent elongation at break. | 60 mins | 4073  460 | 3833  490 |
|  | 90 mins | 2822  450 | 4048  510 |
| Torsional hysteresis (at 280° F.). | 90 mins | 0.099 | .167 |
| Electrical resistivity (Log R). | 60 mins | 10.4 | 6.5 |
|  | 90 mins | 9.6 | 6.7 |
| Abrasion and Adams hardness. | 60 mins | 139  32 | 118  29 |
|  | 90 mins | 160  34 | 139  29 |

The above data show definitely that the presence of p,p'-diaminodiphenylmethane in stock A has speeded up the obtaining of the benefits of the heat treatment process.

*Example 2*

A master batch consisting of 100 parts of smoked sheet rubber, and 50 parts of carbon black was mixed in a conventional manner as set forth in Example 1 whereby the carbon black and rubber are thoroughly and substantially homogeneously mixed. This master batch was divided into two portion A, was added 0.2 part of benzidine in a conventional manner whereby the chemical is thoroughly and substantially homogeneously incorporated. The other portion B, containing no chemical, was given the same amount of milling.

Both mixes A and B were then milled 10 minutes at 300° F. After cooling at least five minutes, these mixes were recovered on a cool mill and the following ingredients were added by conventional mixing; 3 parts of zinc salt of cocoanut oil acids, 2.0 parts of Kadox zinc oxide, 3.5 parts of sulfur, 1 part of palm oil, 5 parts of pine tar, 0.9 part of the reaction product of methylene aniline and butyraldehyde, and 1 part of acetone-diphenylamine reaction product. The stocks were vulcanized 60 and 90 minutes at 45 pounds steam pressure and the vulcanized stocks showed the following properties:

|  | Cure | A | B |
|---|---|---|---|
| Tensiles and per cent elongation at break. | 60 mins | 4000  540 | 4121  560 |
|  | 90 mins | 3577  540 | 3770  540 |
| Abrasion and Adams hardness. | 60 mins | 168  35 | 151  32 |
|  | 90 mins | 176  37 | 164  36 |

*Example 3*

A master batch consisting of 100 parts smoked sheet rubber, 55 parts of carbon black and 2.5 parts of pine tar was made by conventional milling as set forth in Example 1. This master batch was divided into two portions, and to one portion A was added 0.2 part of polyethylene polyamine, by conventional milling. The other portion B containing no chemical was given the same amount of conventional milling.

Both mixes A and B were then milled 10 minutes at 300° F. After cooling at least five minutes, these mixes were recovered on a cool mill and the following ingredients were added by conventional mixing; 3 parts of zinc salt of cocoanut oil acids, 2 parts of Kadox brand of zinc oxide, 1 part of mercaptobenzothiazole, 2 parts of acetone diphenylamine reaction product and 2.625 parts of sulfur. The stocks were then vulcanized 60 and 90 minutes at 30 pounds steam pressure and the vulcanized stocks showed the following properties.

|  | Cure | A | B |
|---|---|---|---|
| Tensile and per cent elongation at break. | 60 mins | 3710  450 | 3965  520 |
|  | 90 mins | 3856  420 | 4141  520 |
| Abrasion and Adams hardness. | 60 mins | 142  33 | 133  35 |
|  | 90 mins | 145  31 | 136  28 |

*Example 4*

A master batch consisting of 90 parts of smoked sheet rubber, 50 parts of carbon black, 4.5 parts of stearic acid, and 1.6 parts of pine tar was made by mixing on a mill at not over 180° F. (rubber temperature). The resulting master batch was divided into two portions and to one portion A was added 0.25 part of p,p'-diaminodiphenylmethane on the mill at not over 180° F. (rubber temperature). The other portion B containing no chemical was given the same amount of milling at the same temperature as A.

Both mixes A and B were then divided in portions and heated in steam at 65 pounds pressure for 30, 60 and 120 minutes. After cooling at least 5 minutes, these mixes were recovered on a cool mill and the following ingredients were added on a mill at not over 180° F. rubber temperature; 10 parts of smoked sheets, 0.4 part of pine tar, 2 parts of Kadox brand of zinc oxide, 1.25 parts of acetonediphenylamine reaction product, 0.35 part of diphenyl-p-phenylene diamine, 1.125 parts of methylene ortho toluidine-mercaptobenzothiazole reaction product and 2.625 parts of sulfur. The stocks were then vulcanized 35 and 70 minutes at 50 lbs. per sq. in. steam pressure and showed the following properties:

|  | A | | | B | | |
|---|---|---|---|---|---|---|
|  | 30' | 60' | 120' | 30' | 60' | 120' |
| Tensiles and per cent elongation at break | 3800  585 | 3800  560 | 3600  565 | 3900  595 | 3600  575 | 3700  585 |
|  | 3500  590 | 3100  525 | 3100  520 | 3500  595 | 3000  540 | 3000  570 |
| Torsional hysteresis (at 280° F.) | .0768 | .0712 | .0680 | .0974 | .0863 | .0826 |
|  | .0867 | .0788 | .0777 | .1135 | .1004 | .0925 |
| Electrical resistivity (Log R) | 9.8 | 11.4 | >12 | 7.4 | 8.5 | 9.6 |
|  | 9.6 | 11.6 | >12 | 7.3 | 8.4 | 9.5 |
| Abrasion and Adams hardness | 164  37 | 171  36 | 173  38 | 158  34 | 165  36 | 169  37 |
|  | 187  40 | 183  42 | 187  41 | 174  37 | 185  39 | 197  41 |

*Example 5*

An example showing the effect of various times of milling is as follows:

A master batch was made consisting of 100 parts of rubber, 55 parts of carbon black and 3.5 parts of pine tar. To a portion A of this master batch on a mill at 140° F. was incorporated 0.25 part of p,p'-diamino diphenylmethane per 100 parts of rubber. A portion B without added chemical was used as a control.

These mixes were then milled at 300° F. for 10, 20, 30 and 60 minutes. After cooling for at least 15 minutes, the mixes were recovered on a cool mill, and then the following ingredients were added: 5 parts of Kadox brand of zinc oxide, 3.5 parts of zinc soap of cocoanut oil acids, 3.0 parts of sulfur and 1.0 part of formaldehyde aniline-mercaptobenzothiazole reaction product.

These mixes were cured 60 minutes at 30 pounds steam pressure and the finished stocks showed the following properties:

| | Time of milling of master batch at 300° F. | A | | B | |
|---|---|---|---|---|---|
| | | Cure=60 min. at 30 lbs. | | | |
| Tensile strength | 10 min | 4340 | | 4300 | |
| | 20 min | 4120 | | 4300 | |
| | 30 min | 4040 | | 4340 | |
| | 60 min | 3860 | | 4050 | |
| Torsional hysteresis (at 280° F.) | 10 min | .108 | | .144 | |
| | 20 min | .094 | | .104 | |
| | 30 min | .080 | | .097 | |
| | 60 min | .062 | | .073 | |
| Electrical resistivity (Log R) | 10 min | 10.5 | | 8.0 | |
| | 20 min | 11.5 | | 10.0 | |
| | 30 min | 12.1 | | 10.9 | |
| | 60 min | 12.1 | | 12.1 | |
| Grasselli abrasion and Shore hardness | 10 min | 140.0 | 61 | 178.0 | 62 |
| | 20 min | 134.5 | 58 | 144.5 | 59 |
| | 30 min | 126.5 | 59 | 139.5 | 59 |
| | 60 min | 113.5 | 58 | 119.5 | 58 |

The above data plainly show the effect of the chemical on speeding up the effect of attaining maximum properties.

Electrical resistivity was determined by measuring the resistance of a specimen of known thickness (about 0.1 inch) placed between mercury electrodes, under a potential difference of 135 volts, using a sensitive galvanometer with an Ayrton shunt. In the tables of data herein, the logarithm (to base 10) of the specific electrical resistivity (ohm-cms.) is designated "Log R".

The torsional hysteresis represents the logarithmic decrement (base 10) of the observed amplitudes of successive oscillations of a torsion pendulum, measured at 280° F. (137.8° C.) with an apparatus consisting essentially of a torsion pendulum in which the sample of rubber tested supplies the restoring force when the pendulum is deflected. For further description of this testing see U. S. P. 2,118,601.

The abrasion resistance is expressed by figures which are inversely proportional to the amount of wear (reduction in thickness) effected during a fixed number of cycles on the United States Rubber Company abrasion testing machine. The machine is operated with the abrasive wheel rotating at 180 R. P. M. and with a total load on the sample of six pounds.

In the Grasselli abrasion test which is used in Example 5, the abrasion resistance is expressed in cubic centimeters of material removed per horse power hour. This test is described in A. S. T. M. Standards on Rubber Products for October, 1935, pages 42 to 44.

The visible changes taking place in the hot milling method as described in the above examples are somewhat similar to those described in U. S. P. 2,118,601. However, the viscosity increase during high temperature treatment may even be greater. As the hot milling proceeds the mix finally begins to smooth out. The smoothing out need not necessarily be done on the hot mill but it may be subsequently carried out on a cool mill. In the steam process in which the mix is not milled during heating, smoothing out does not occur in the heater but is obtained upon the relatively cooler recovery mill.

The invention is not limited in the amount of chemical, although the preferred amounts vary from 0.05 to 2.0 parts per one hundred parts of rubber.

The use of these chemicals is not limited to the purity of the chemical. The pure chemicals or crude reaction product from the preparation of these chemicals or admixtures of these chemicals with other chemicals or compositions may be used to speed up the heat treatment process.

The di(primary) amines may be added at any time during or preceding the heat treatment, that is, they may be added to the rubber before the carbon black, along with it or after the carbon black, and then the resulting master batch subjected to the heat treatment. It is understood that this is controlled within limits avoiding serious degradation of the rubber since it is known that either excessive milling of rubber in air or excessive heating at elevated temperatures of rubber tends to break down (degrade) the rubber molecules. Rubber vulcanizates made from degraded rubber have unusually low tensile strength, poor resistance to tear, and poor resistance to ageing. By the present invention the tensile strength of the resulting vulcanizates is not lowered more than 10% by the heat-treatment. Instead of heat treating on a mill, the heating may be conducted in a heater in an atmosphere of hot air, steam, nitrogen, or a mixture of air and steam, or in water, etc. Where heating is carried out in a medium such as steam or a mixture of air and steam, the stock is preferably heated while in thin layers, while the mixture is static, i. e. there is no mechanical agitation of the mix taking place, as distinguished from a masticating or milling operation. Also, in carrying out the invention the usual softeners and other ingredients, may be included, if desired, in the initial mixture of rubber, black and chemical for the purpose of softening the rubber and facilitating the admixture and distribution of the black therein, or for the purpose of improving the properties of the final vulcanizate; for example, such softeners as oils, tars, fatty acids, fatty acid soaps, and mineral rubber, may be added. The raw rubber may also be blended with reclaimed rubber in any proportions. The rubber used in the master batches may have been softened by any of the processes known to the art, such as heating in air, steam or mixtures thereof, or mastication in the presence of zinc oxide, zinc soaps, lead dioxides, or other types of plasticizing agents.

Whereas the invention is adaptable broadly to all kinds of black it is particularly concerned with what are known as rubber reinforcing blacks, which blacks are herein distinguishable from the so-called soft rubber blacks of larger particle size, which are non-reinforcing, and flocculable to a lesser extent by heat, and from blacks of extremely small particle size like paint black and ink black.

While the invention is particularly significant in relation to tire tread compositions, it is also applicable to the manufacture of any rubber products in which are desired the qualities of high abrasion resistance, toughness, flexibility, high electrical resistivity or low hysteresis, etc., such as footwear outsoles, pneumatic inner tubes, hose, belting, vibration-absorbing mountings, tank linings, etc.

The term "rubber" is used in its usual generic sense applicable to caoutchouc and similar vulcanizable gums, as well as to various synthetic rubbers and rubber-like products which have properties in common with natural rubber whereby they may be adapted to the same commercial uses.

The use of these compounds is not limited as to the temperature, time, pressure, or method of vulcanization. Also vulcanizing agents other than sulfur may be used for the vulcanization of the compounds used. They may be used in rubber mixes subjected to mold cures, air cures, ammonia cures, submarine cures, steam cures, etc.

The promoters, as stated above, may be added before or during heat treatment, may be put into the rubber by mill incorporation, by impregnation, or otherwise.

Having thus described my invention, what I claim and desire to protect by Letters Patent is:

1. A process which comprises mixing rubber with a relatively large amount of carbon black, and a small amount of a di(primary) amine, heating the mix to a temperature substantially above 250° F. to severely flocculate the black, and thereafter masticating the mix to substantially completely disperse the flocculated black.

2. A process which comprises mixing rubber with a relatively large amount of carbon black, and a small amount of an aliphatic di(primary)-amine, heating the mix to a temperature substantially above 250° F. to severely flocculate the black, and thereafter masticating the mix to substantially completely disperse the flocculated black.

3. A process which comprises mixing rubber with a relatively large amount of carbon black, and a small amount of an aromatic di(primary)-amine, heating the mix to a temperature substantially above 250° F. to severely flocculate the black, and thereafter masticating the mix to substantially completely disperse the flocculated black.

4. A process which comprises mixing rubber with a relatively large amount of carbon black, and a small amount of an aromatic para-di-(primary) amine, heating the mix to a temperature substantially above 250° F. to severely flocculate the black, and thereafter masticating the mix to substantially completely disperse the flocculated black.

5. A process which comprises mixing rubber with a relatively large amount of a rubber reinforcing black, and a small amount of a di(primary) amine, heating the mix to a temperature substantially above 250° F., and thereafter masticating the mix and completing incorporation of additional compounding ingredients and vulcanizing ingredients.

6. A process which comprises mixing rubber with a relatively large amount of a rubber reinforcing black, and a small amount of a p,p'-diaminodiaryl methane, heating the mix to a temperature substantially above 250° F., and thereafter masticating the mix and completing incorporation of additional compounding ingredients and vulcanizing ingredients.

7. A process which comprises mixing rubber with a relatively large amount of carbon black, and a small amount of a di(primary) amine, heating the mix to a temperature in the range from about 300° F. to about 370° F., and thereafter masticating the mix and completing incorporation of additional compounding and vulcanizing ingredients.

8. A process which comprises mixing rubber with a relatively large a mount of carbon black, and a small amount of a di(primary) amine, heating the mix to a temperature substantially above 250° F. and not above about 370° F. to severely flocculate the black, and thereafter masticating the mix for a time sufficient to substantially completely disperse the flocculated black.

LOUIS H. HOWLAND.